United States Patent
Yang et al.

(10) Patent No.: US 11,694,855 B2
(45) Date of Patent: Jul. 4, 2023

(54) MOFS COMPOSITE ELECTRODE MATERIAL FOR SUPERCAPACITORS, PREPARATION METHOD THEREOF, AND WORKING ELECTRODE

(71) Applicant: University of Electronic Science and Technology of China, Sichuan (CN)

(72) Inventors: Yajie Yang, Sichuan (CN); Liuwei Shi, Sichuan (CN); Runhui Xi, Sichuan (CN); Chengpeng Wang, Sichuan (CN); Zhaokun Wu, Sichuan (CN); Weiye Sun, Sichuan (CN); Xiaoting Zha, Sichuan (CN); Dan Tu, Sichuan (CN); Jianhua Xu, Sichuan (CN)

(73) Assignee: University of Electronic Science and Technology of China, Sichuan (CN)

( * ) Notice: Subject to any disclaimer, the term of this patent is extended or adjusted under 35 U.S.C. 154(b) by 326 days.

(21) Appl. No.: 17/098,369

(22) Filed: Nov. 14, 2020

(65) Prior Publication Data

US 2021/0065997 A1 Mar. 4, 2021

(30) Foreign Application Priority Data

Jun. 11, 2020 (CN) .......................... 202010528596.8

(51) Int. Cl.
*H01G 11/30* (2013.01)
*H01B 1/06* (2006.01)
*H01G 11/86* (2013.01)

(52) U.S. Cl.
CPC .............. *H01G 11/86* (2013.01); *H01B 1/06* (2013.01); *H01G 11/30* (2013.01)

(58) Field of Classification Search
CPC ........ H01G 11/86; H01G 11/30; H01G 11/22; H01G 11/48; H01B 1/06
See application file for complete search history.

(56) References Cited

U.S. PATENT DOCUMENTS

2017/0294678 A1* 10/2017 Lee .................. H01M 4/134
2020/0274080 A1* 8/2020 Britt ..................... C09K 11/06

FOREIGN PATENT DOCUMENTS

| CN | 104979104 A | * | 10/2015 | |
| CN | 106397491 A | * | 2/2017 | |
| CN | 110112004 A | * | 8/2019 | ............. B82Y 30/00 |

OTHER PUBLICATIONS

Poly L-Dopa/poly(ethylenedioxythiophene) as a novel mussel-inspired electroactive binder for environmentally friendly hybrid supercapacitors, Heydaripour et al., Turk J Chem (2018) 42: 1238-1250.*
Effect of Thermal Treatment Temperature on Electrochemical Behaviors of Ni/trimesic Acid-based Metal Organic Frameworks Electrodes for Supercapacitors, Kim et al., Appl. Chem. Eng., vol. 30, No. 1, Feb. 2019, 11-16.*
Carbon Cloth-based Hybrid Materials as Flexible Electrochemical Supercapacitors, Mishra et al., ChemElectroChem 2019, 6, 5771-5786.*

* cited by examiner

*Primary Examiner* — Haidung D Nguyen (57) ABSTRACT

An MOFs composite electrode material for supercapacitors includes: a Ni-BSC matrix, and a PEDOT coating layer coated on the Ni-BTC matrix, wherein a molar ratio of EDOT to Ni-BTC is 1:(1-4) based on a molar amount of EDOT monomer. A method for preparing the MOFs composite electrode material includes steps of: using nickel nitrate hexahydrate and benzenetricarboxylic acid as raw materials to synthesize Ni-BTC by a hydrothermal method; and using a liquid phase method to grow PEDOT on a surface of the Ni-BTC. An MOFs composite electrode slurry and a working electrode for the supercapacitors including the above MOFs composite electrode material or a MOFs composite electrode material prepared by the above method are also provided. The MOFs composite electrode material provided by the present invention combines advantages of Ni-BTC and PEDOT.

15 Claims, 7 Drawing Sheets

MOFS COMPOSITE ELECTRODE MATERIAL FOR SUPERCAPACITORS, PREPARATION METHOD THEREOF, AND WORKING ELECTRODE

CROSS REFERENCE OF RELATED APPLICATION

The present invention claims priority under 35 U.S.C. 119(a-d) to CN 202010528596.8, filed Jun. 11, 2020.

BACKGROUND OF THE PRESENT INVENTION

Field of Invention

The present invention relates to a technical field of supercapacitor electrode materials, and more particularly to an MOFs composite electrode material for supercapacitors and a preparation method thereof.

Description of Related Arts

With the increasing consumption of non-renewable resources and the increasing environmental pollution caused by the consumption, the global demand for the development of sustainable energy continues to grow. Therefore, the research and development of a novel electrochemical energy storage device, which should be high-efficiency and eco-friendly, have become one of the major strategic choices for the sustainable development of our society. Among them, as a new type of energy storage device between conventional capacitors and rechargeable batteries, supercapacitors have higher power density than rechargeable batteries, and have many advantages such as high charge and discharge efficiency, long service life and environmental friendliness, so as to be widely used in many fields such as electronic communication, energy chemical industry, aerospace, etc.

MOFs (Metal-Organic Framework) are porous network framework structure materials formed by coordination of metal ions and organic ligands. Compared with conventional porous materials, MOFs have the advantages such as diverse structures, high porosity, large specific surface area, adjustable pore volume, and easy functionalization of pore surface area. One representative MOFs material is: Ni-BTC, which is a nickel-based metal organic framework compound synthesized by one-step hydrothermal method, wherein nickel nitrate hexahydrate is involved as a metal source and benzenetricarboxylic acid (BTC) is involved as an organic ligand.

In recent years, porous MOFs and derivatives have gradually been applied to the technical field of electrochemical energy storage, such as lithium ion batteries, fuel cells, and supercapacitors. However, due to the poor conductivity and poor stability of MOFs, the application in supercapacitors is limited.

PEDOT is a polymer of EDOT (3,4-ethylenedioxythiophene monomer), which has simple molecular structure, small energy gap, high conductivity, good stability, and good conductivity, and is widely used in researches of organic film solar cell materials, OLED materials, electrochromic materials, transparent electrode materials, and other fields.

The present invention provides a method for preparing a Ni-BTC@PEDOT composite electrode material by compounding PEDOT and MOFs materials, specifically Ni-BTC, which can effectively solve the conventional problems of MOFs and obtain a supercapacitor composite electrode material with sufficient comprehensive performance.

SUMMARY OF THE PRESENT INVENTION

An object of the present invention is to solve the problems of poor conductivity and poor stability of MOFs in supercapacitors, and provide an MOFs composite electrode material for supercapacitors and its application in supercapacitors, wherein the MOFs composite electrode material is prepared by liquid-phase composite of PEDOT and Ni-BTC. The composite electrode material prepared combines the advantages of Ni-BTC and PEDOT, and has excellent electrochemical performance, conductivity and cycle stability. Comprehensive performance of the electrode material has been greatly improved.

Accordingly, in order to accomplish the above objects, the present invention provides:

an MOFs composite electrode material for supercapacitors, comprising: a Ni-BTC matrix, and a PEDOT coating layer coated on the Ni-BTC matrix, wherein a molar ratio of EDOT to Ni-BTC is 1:(1-4) based on a molar amount of EDOT monomer. Specifically, the PEDOT coating layer is coated on pore internal walls of the Ni-BTC matrix.

The present invention also provides a method for preparing an MOFs composite electrode material for supercapacitors, comprising steps of:

S1: using nickel nitrate hexahydrate and benzenetricarboxylic acid as raw materials to synthesize Ni-BTC by a hydrothermal method; and S2: using a liquid phase method to grow PEDOT on the Ni-BTC, so as to obtain the MOFs composite electrode material Ni-BTC@PEDOT.

Preferably, the step S1 specifically comprises steps of:

S101: dissolving a certain proportion of the nickel nitrate hexahydrate and the benzenetricarboxylic acid in a first solvent in sequence, and fully stirring to form a uniform mixed solution;

S102: transferring the mixed solution obtained in the step S101 to an autoclave, and heating at a temperature of 140-160° C. for 15-21 hours; and S103: washing a product obtained in the step S102 for 2-3 times, and drying to obtain the Ni-BTC.

Preferably, in the step S101, a molar ratio of the nickel nitrate hexahydrate to the benzenetricarboxylic acid is (1.6-2):1.

Preferably, the first solvent in the step S101 is generally alcohol, which is used to dissolve the nickel nitrate hexahydrate and the benzenetricarboxylic acid.

Preferably, the autoclave in the step S102 is an autoclave lined with polytetrafluoroethylene. Because polytetrafluoroethylene has good corrosion resistance, and is resistant to strong acids and alkalis and various organic solvents, and does not adhere, it can avoid unnecessary impurities in the reaction.

Preferably, cleaning in the step S103 uses alcohol or N—N dimethylformamide, but N—N dimethylformamide is more toxic than alcohol, so alcohol is more preferred. Generally, cleaning is performed for 3 times.

Preferably, the step S2 specifically comprises steps of:

S201: adding EDOT into isopropanol and stirring for 20-30 minutes until the EDOT is fully dissolved in the isopropanol to obtain a first solution;

S202: then adding the Ni-BTC prepared in the step S1 to the first solution, stirring for 20-30 minutes, and ultrasonicating for 10-20 minutes, so as to allow the EDOT in the first solution to enter pores of the Ni-BTC to obtain the second solution;

S203: then adding an appropriate amount of oxidant to the second solution, and stirring for 2-3 hours to obtain a composite solution; and S204: finally, suction-filtering and cleaning the obtained composite solution, and vacuum-drying at 50-70° C. for 5-7 hours to obtain the composite electrode material Ni-BTC@PEDOT.

Preferably, in the step S203, the oxidant is a trivalent iron salt, for example: ferric p-toluenesulfonate and iron trichloride. More preferably, in order to prevent hydrolysis of iron ions in the trivalent iron salt, a corresponding acid should be added together with the ferric. For example: while adding ferric p-toluenesulfonate as the oxidant, p-toluenesulfonic acid monohydrate is also added to prevent hydrolysis of ferric ions; or while adding iron trichloride as the oxidant, hydrochloric acid is also added to prevent hydrolysis of ferric ion.

More preferably, in the step S203, the oxidant is iron p-toluenesulfonate, and p-toluenesulfonic acid monohydrate is also added to prevent hydrolysis of ferric ions;

a molar ratio of the p-toluenesulfonic acid monohydrate, the iron p-toluenesulfonate, and the EDOT is (1-2.5):(1-2.5):1.

Preferably, vacuum-drying of the step S204 is performed in a vacuum drying box.

Preferably, a molar ratio of the EDOT to the Ni-BTC is 1:(1-4).

Preferably, in the step S201, a volume ratio of the EDOT to the isopropanol is 1:(100-400).

The present invention also provides an MOFs composite electrode slurry for supercapacitors, comprising: an electrode material, a conductive agent, an adhesive agent, and a solvent, wherein the electrode material is the above MOFs composite electrode material for the supercapacitors or a MOFs composite electrode material for the supercapacitors prepared by the above method.

Specifically, the conductive agent in the slurry is a conventional electrode material conductive agent, such as acetylene black.

Specifically, the adhesive agent in the slurry is a conventional electrode material adhesive agent, such as polyvinylidene fluoride.

Specifically, the solvent in the slurry is a conventional electrode material solvent, such as N—N dimethylformamide.

Preferably, the present invention provides a MOFs composite electrode slurry for supercapacitors, comprising the above MOFs composite electrode material for the supercapacitors or a MOFs composite electrode material for the supercapacitors prepared by the above method, acetylene black, polyvinylidene fluoride, and N—N dimethylformamide, wherein a mass ratio of the electrode material, the acetylene black, the polyvinylidene fluoride, and the N—N dimethylformamide is (7-8):(2-1):1:100. Preferably, the mass ratio is: 8:1:1:100.

The present invention also provided a working electrode for supercapacitors, prepared by coating the above MOFs composite electrode slurry for the supercapacitors on carbon cloth and drying. Coating methods, coating thickness and other conditions can refer to conventional supercapacitor working electrode manufacturing method.

The present invention also provides a supercapacitor, comprising the above working electrode.

In the preparation process provided by the present invention, the EDOT monomer is firstly dispersed and grown on the Ni-BTC matrix material. Specifically, the EDOT enters the pores of the Ni-BTC matrix material, and is grown and coated on the internal walls of the pores. Then with the oxidant, the EDOT monomer is polymerized to form the PEDOT coated on the Ni-BTC, which not only improves conductivity, but also protects the structure of Ni-BTC to a certain extent.

Beneficial effects of the present invention are as follows.

The present invention prepares the Ni-BTC@PEDOT composite electrode material by growing the PEDOT on a surface of the Ni-BTC with the liquid phase method. The prepared composite electrode material combines the advantages of the Ni-BTC and the PEDOT and has excellent electrochemical performance, electrical conductivity, and cycle stability.

BRIEF DESCRIPTION OF THE DRAWINGS

In order to illustrate the technical solutions of the embodiments of the present invention more clearly, the drawings in the following description are only some embodiments of the present invention. For those of ordinary skill in the art, other drawings can be obtained based on these drawings without creative work.

DETAILED DESCRIPTION OF THE PREFERRED EMBODIMENT

In one aspect, the present invention provides an MOFs composite electrode material for supercapacitors and a preparation method thereof, wherein the MOFs composite electrode material comprises: a Ni-BTC matrix, and a PEDOT coating layer coated on the Ni-BTC matrix, wherein a molar ratio of EDOT to Ni-BTC is 1:(1-4) based on a molar amount of EDOT monomer. Specifically, the PEDOT coating layer is coated on pore internal walls of the Ni-BTC matrix.

The method for preparing the MOFs composite electrode material comprises steps of:

S1: using nickel nitrate hexahydrate and benzenetricarboxylic acid as raw materials to synthesize Ni-BTC by a hydrothermal method; preferably, the step S1 specifically comprises steps of:

S101: dissolving a certain proportion of the nickel nitrate hexahydrate and the benzenetricarboxylic acid in a first solvent in sequence, and fully stirring to form a uniform mixed solution; preferably, a molar ratio of the nickel nitrate hexahydrate to the benzenetricarboxylic acid is (1.6-2):1, and the first solvent is generally alcohol;

S102: transferring the mixed solution obtained in the step S101 to an autoclave, and heating at a temperature of 140-160° C. for 15-21 hours; preferably, the autoclave is an autoclave lined with polytetrafluoroethylene, wherein because polytetrafluoroethylene has good corrosion resistance, and is resistant to strong acids and alkalis and various organic solvents, and does not adhere, it can avoid unnecessary impurities in the reaction; and S103: washing a product obtained in the step S102 for 2-3 times, and drying to obtain the Ni-BTC; preferably, cleaning adopts alcohol or N—N dimethylformamide, but N—N dimethylformamide is more toxic than alcohol, so alcohol is more preferred; generally, cleaning is performed for 3 times;

S2: using a liquid phase method to grow PEDOT on the Ni-BTC, so as to obtain the MOFs composite electrode material Ni-BTC@PEDOT; preferably, the step S2 specifically comprises steps of:

S201: adding EDOT into isopropanol and stirring for 20-30 minutes until the EDOT is fully dissolved in the isopropanol to obtain a first solution; preferably, a volume ratio of the EDOT to the isopropanol is 1:(100-400);

S202: then adding the Ni-BTC prepared in the step S1 to the first solution, stirring for 20-30 minutes, and ultrasonicating for 10-20 minutes, so as to allow the EDOT in the first solution to enter pores of the Ni-BTC to obtain the second solution; preferably, a molar ratio of the EDOT to the Ni-BTC is 1:(1-4);

S203: then adding an appropriate amount of oxidant to the second solution, and stirring for 2-3 hours to obtain a composite solution; preferably, the oxidant is a trivalent iron salt, for example: ferric p-toluenesulfonate and iron trichloride; more preferably, in order to prevent hydrolysis of iron ions in the trivalent iron salt, a corresponding acid should be added together with the ferric; for example: while adding ferric p-toluenesulfonate as the oxidant, p-toluenesulfonic acid monohydrate is also added to prevent hydrolysis of ferric ions; or while adding iron trichloride as the oxidant, hydrochloric acid is also added to prevent hydrolysis of ferric ion; more preferably, the oxidant is iron p-toluenesulfonate, and p-toluenesulfonic acid monohydrate is also added to prevent hydrolysis of ferric ions; a molar ratio of the p-toluenesulfonic acid monohydrate, the iron p-toluenesulfonate, and the EDOT is (1-2.5):(1-2.5):1; and S204: finally, suction-filtering and cleaning the obtained composite solution, and vacuum-drying at 50-70° C. for 5-7 hours to obtain the composite electrode material Ni-BTC@PEDOT; preferably, vacuum-drying is performed in a vacuum drying box.

In another aspect, the present invention provides a MOFs composite electrode slurry and a working electrode for supercapacitors adopting the above MOFs composite electrode material for the supercapacitors or a MOFs composite electrode material for the supercapacitors prepared by the above method; wherein:

the MOFs composite electrode slurry for the supercapacitors comprises: an electrode material, a conductive agent, an adhesive agent, and a solvent, wherein the electrode material is the above MOFs composite electrode material for the supercapacitors or a MOFs composite electrode material for the supercapacitors prepared by the above method.

Preferably, the conductive agent in the slurry is a conventional electrode material conductive agent, such as acetylene black.

Preferably, the adhesive agent in the slurry is a conventional electrode material adhesive agent, such as polyvinylidene fluoride.

Preferably, the solvent in the slurry is a conventional electrode material solvent, such as N—N dimethylformamide.

More preferably, the present invention provides a MOFs composite electrode slurry for supercapacitors, comprising the above MOFs composite electrode material or a MOFs composite electrode material prepared by the above method, acetylene black, polyvinylidene fluoride, and N—N dimethylformamide, wherein a mass ratio of the electrode material, the acetylene black, the polyvinylidene fluoride, and the N—N dimethylformamide is (7-8):(2-1):1:100. Preferably, the mass ratio is: 8:1:1:100.

The working electrode for supercapacitors is prepared by coating the above MOFs composite electrode slurry for the supercapacitors on carbon cloth and drying. Coating methods, coating thickness and other conditions can refer to conventional supercapacitor working electrode manufacturing method.

The present invention also provides a supercapacitor, comprising the above working electrode.

In order to better illustrate the content of the present invention, the following further verification is carried out through specific embodiments in combination with the drawings. It is hereby explained that the specific embodiments are only to describe the present invention more directly and are only a part of the present invention, which cannot constitute any limitation to the present invention.

I. Preparation of Electrode Materials

Embodiment 1: MOFs Composite Electrode Material Ni-BTC@PEDOT

Step 1: weighing nickel nitrate hexahydrate and benzenetricarboxylic acid according to a molar ratio of 1.6:1, firstly dissolving the nickel nitrate hexahydrate in alcohol, then fully stirring before adding the benzenetricarboxylic acid, and fully stirring to form a mixed solution;

Step 2: transferring the mixed solution in the step 1 to an autoclave lined with polytetrafluoroethylene, and heating for 15 hours at a temperature of 160 degrees;

Step 3: washing a product obtained in the step 2 with alcohol for 3 times, and drying at 60 degrees for 10 hours to obtain Ni-BTC;

Step 4: adding 0.11 ml (1.04 mmol) EDOT to 40 ml isopropanol and stirring for 20 minutes to fully dissolve the EDOT in the isopropanol to obtain a first solution; adding 4.24 mmol (about 0.25 g) Ni-BTC prepared in the step 3 to the first solution, stirring for 20 minutes, and ultrasonicating for 10 minutes to allow the EDOT in the first solution to enter pores of the Ni-BTC, so as to obtain a second solution;

Step 5: adding 2.5 mmol iron p-toluenesulfonate and 2.5 mmol p-toluenesulfonic acid monohydrate into the second solution obtained in the step 4, and stirring for 3 hours to obtain a composite solution; and Step 6: suction-filtering and cleaning the composite solution obtained in the step 5, and drying in a vacuum drying box at 70 degrees for 5 hours to obtain the MOFs composite electrode material Ni-BTC@PEDOT, which is labeled as A1.

Embodiment 2: MOFs Composite Electrode Material Ni-BTC@PEDOT

Step 1: weighing nickel nitrate hexahydrate and benzenetricarboxylic acid according to a molar ratio of 1.8:1, firstly dissolving the nickel nitrate hexahydrate in alcohol, then fully stirring before adding the benzenetricarboxylic acid, and fully stirring to form a mixed solution;

Step 2: transferring the mixed solution in the step 1 to an autoclave lined with polytetrafluoroethylene, and heating for 18 hours at a temperature of 150 degrees;

Step 3: washing a product obtained in the step 2 with alcohol for 3 times, and drying at 60 degrees for 10 hours to obtain Ni-BTC;

Step 4: adding 0.23 ml (2.17 mmol) EDOT to 50 ml isopropanol and stirring for 25 minutes to fully dissolve the EDOT in the isopropanol to obtain a first solution; adding 4.24 mmol (about 0.25 g) Ni-BTC prepared in the step 3 to the first solution, stirring for 25 minutes, and ultrasonicating for 15 minutes to obtain a second solution;

Step 5: adding 3.53 mmol iron p-toluenesulfonate and 3.53 mmol p-toluenesulfonic acid monohydrate into the second solution obtained in the step 4, and stirring for 3 hours to obtain a composite solution; and Step 6: suction-filtering and cleaning the composite solution obtained in the step 5, and drying in a vacuum drying box at 60 degrees for 6 hours to obtain the MOFs composite electrode material Ni-BTC@PEDOT, which is labeled as A2.

Embodiment 3: MOFs Composite Electrode Material Ni-BTC@PEDOT

Step 1: weighing nickel nitrate hexahydrate and benzenetricarboxylic acid according to a molar ratio of 2:1, firstly dissolving the nickel nitrate hexahydrate in alcohol, then fully stirring before adding the benzenetricarboxylic acid, and fully stirring to form a mixed solution;

Step 2: transferring the mixed solution in the step 1 to an autoclave lined with polytetrafluoroethylene, and heating for 15 hours at a temperature of 180 degrees;

Step 3: washing a product obtained in the step 2 with alcohol for 3 times, and drying at 60 degrees for 10 hours to obtain Ni-BTC;

Step 4: adding 0.45 ml (4.24 mmol) EDOT to 60 ml isopropanol and stirring for 30 minutes to fully dissolve the EDOT in the isopropanol to obtain a first solution; adding 4.24 mmol (about 0.25 g) Ni-BTC prepared in the step 3 to the first solution, stirring for 30 minutes, and ultrasonicating for 20 minutes to obtain a second solution;

Step 5: adding 4.24 mmol iron p-toluenesulfonate and 4.24 mmol p-toluenesulfonic acid monohydrate into the second solution obtained in the step 4, and stirring for 3 hours to obtain a composite solution; and Step 6: suction-filtering and cleaning the composite solution obtained in the step 5, and drying in a vacuum drying box at 70 degrees for 5 hours to obtain the MOFs composite electrode material Ni-BTC@PEDOT, which is labeled as A3.

Comparison 1: MOFs Electrode Material Ni-BTC

Step 1: weighing nickel nitrate hexahydrate and benzenetricarboxylic acid according to a molar ratio of 1.8:1, firstly dissolving the nickel nitrate hexahydrate in alcohol, then fully stirring before adding the benzenetricarboxylic acid, and fully stirring to form a mixed solution;

Step 2: transferring the mixed solution in the step 1 to an autoclave lined with polytetrafluoroethylene, and heating for 18 hours at a temperature of 150 degrees; and Step 3: washing a product obtained in the step 2 with alcohol for 3 times, and drying at 60 degrees for 10 hours to obtain Ni-BTC, which is labeled as D1.

II. Preparation of Working Electrodes for Supercapacitors

According to a mass ratio of 8:1:1:100, weighing the electrode materials obtained in the embodiments 1-3 and the comparison 1 (A1, A2, A3, D1), polyvinylidene fluoride, acetylene black and N—N dimethyl formamide, then dissolving the electrode material, the polyvinylidene fluoride, and the acetylene black in the N—N dimethyl formamide; stirring to form a uniform slurry, and then applying the slurry on a 1 cm*3 cm carbon cloth; drying at 60 degrees to obtain a working electrode.

III. Performance Test

Figure 5A:
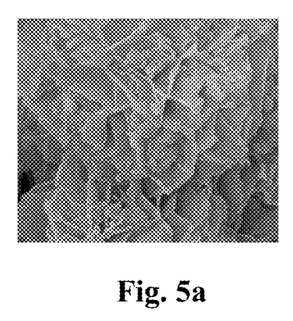
FIG. 5a is an SEM image of a sample A2 of the embodiment 2 under a ruler length of 3 μm×50000.
Figure 5B:
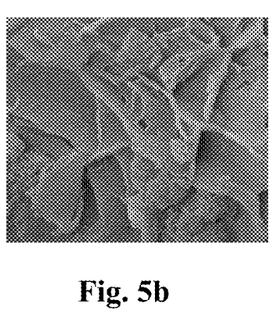
FIG. 5b is an SEM image of the sample A2 of the embodiment 2 under a ruler length of 1 μm×100000.
Figure 5C:
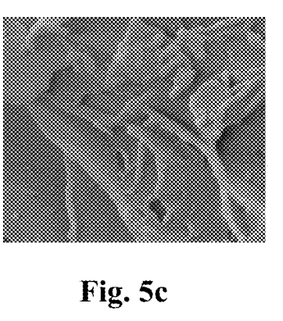
FIG. 5c is an SEM image of the sample A2 of the embodiment 2 under a ruler length of 500 nm×200000.

1. Morphological analysis on the electrode material samples prepared in the above embodiments and comparison 1) FIGS. 5a-5c are SEM images of the Ni-BTC sample D1 of the comparison 1 under different magnifications, wherein Ni-BTC has a flower-like morphology and smooth surfaces.

Figure 5D:
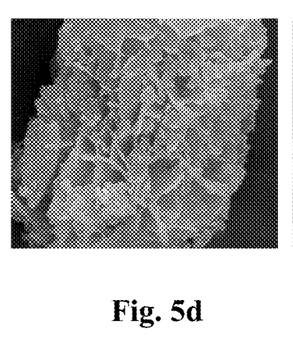
FIG. 5d is an SEM image of a sample D1 of the comparison 1 under a ruler length of 3 μm×50000.
Figure 5E:
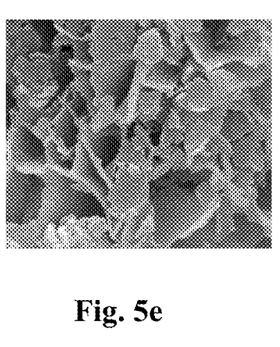
FIG. 5e is an SEM image of the sample D1 of the comparison 1 under a ruler length of 1 μm×100000.
Figure 5F:
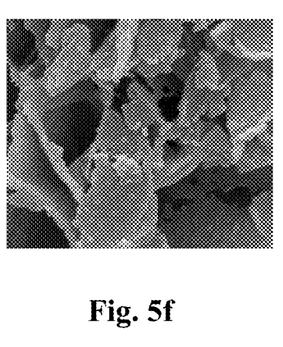
FIG. 5f is an SEM image of the sample D1 of the comparison 1 under a ruler length of 500 nm×200000.

2) FIGS. 5d-5f are SEM images of the Ni-BTC@PEDOT sample A2 of the embodiment 2 under different magnifications. Compared with the SEM images of the sample D1, the sample surfaces are no longer smooth and have obvious graininess, which is caused by the growth of the PEDOT on the surface of the Ni-BTC. It can be seen from the figures that the PEDOT is mainly coated on pore internal walls of the Ni-BTC matrix. The growth of the PEDOT on the surface of the Ni-BTC can not only improve material conductivity, but also protect the structure of the Ni-BTC to a certain extent, thereby improving stability.

The samples A1 and A3 of the embodiments 1 and 3 also have a similar morphology as the sample A2, which will not be specifically explained here.

Figure 1A:
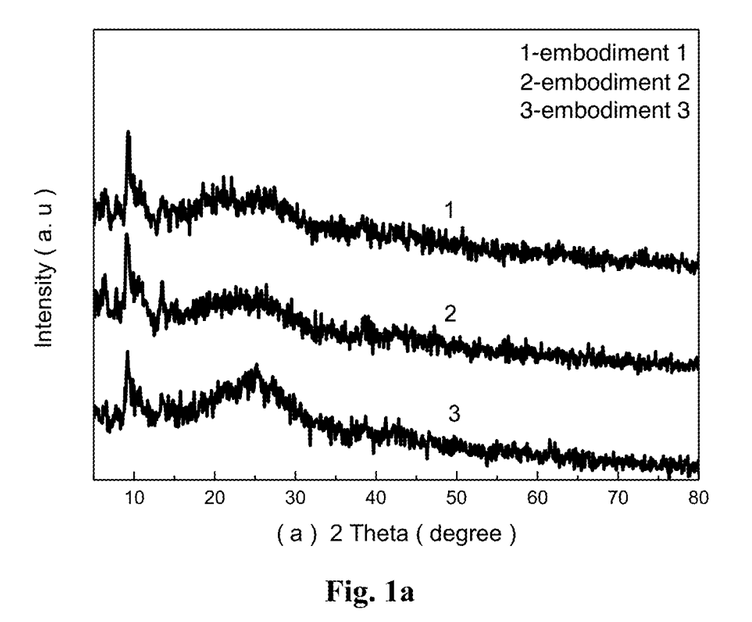
FIG. 1a is an XRD diagram of embodiments 1-3.
Figure 1B:
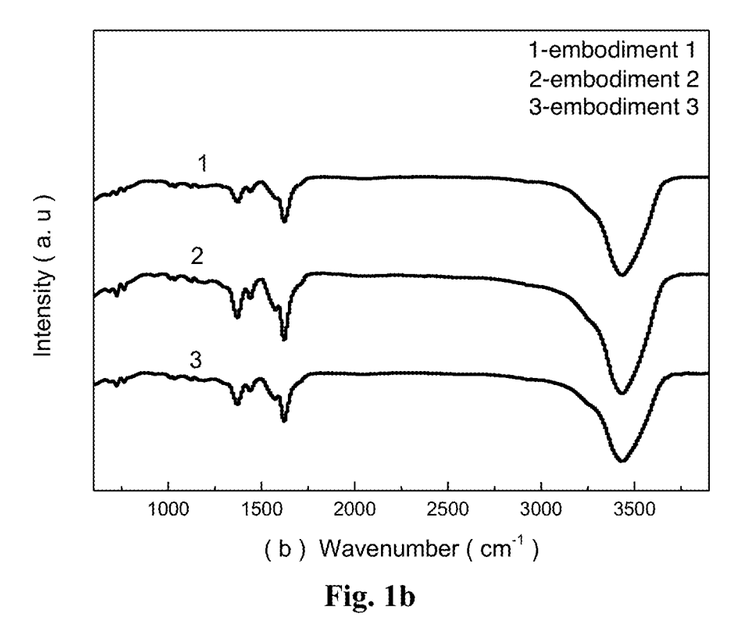
FIG. 1b is an FTIR comparison chart of the embodiments 1-3.
Figure 2A:
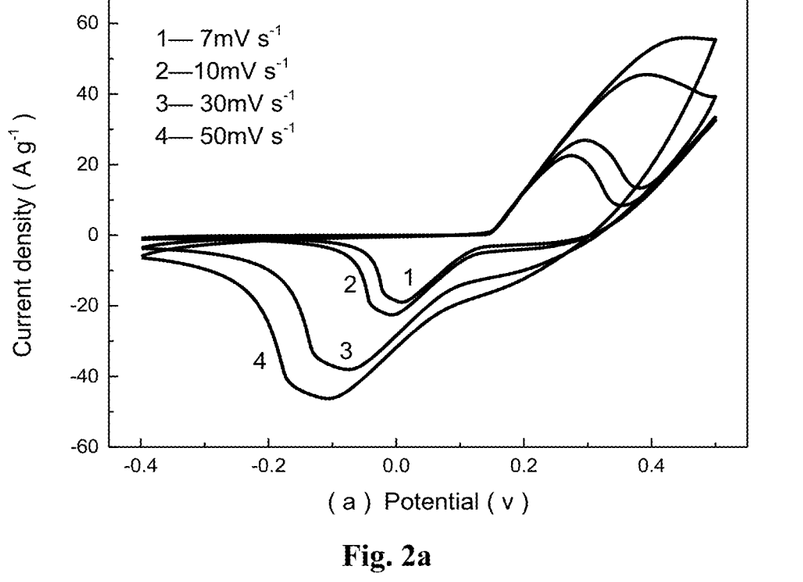
FIG. 2a is a CV curve diagram of the embodiment 1 under different scan rates of 7-50 mV $s^{-1}$.
Figure 2B:
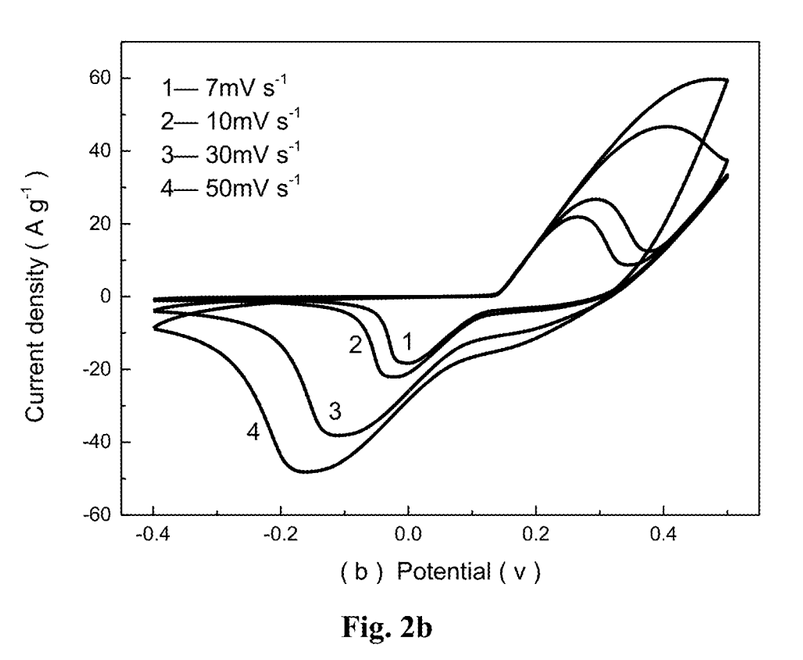
FIG. 2b is a CV curve diagram of the embodiment 2 under different scan rates of 7-50 mV $s^{-1}$.
Figure 2C:
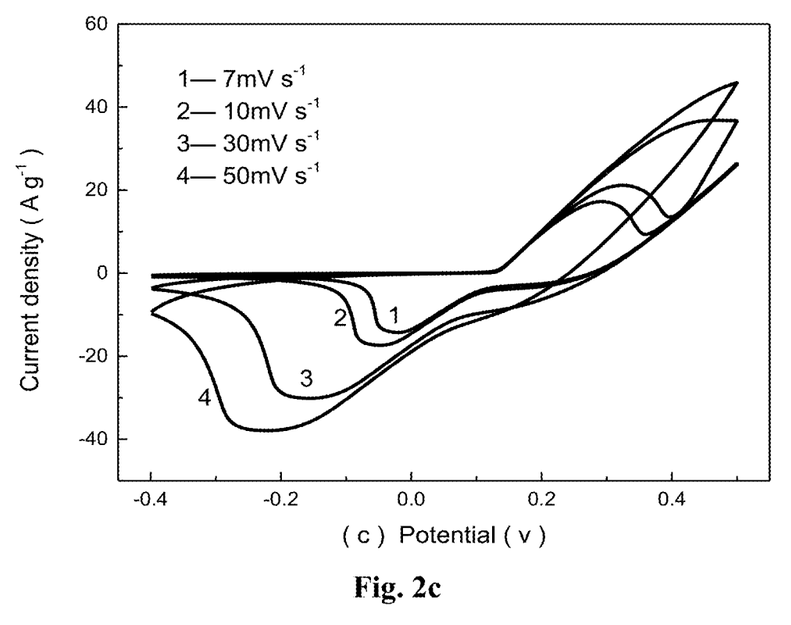
FIG. 2c is a CV curve diagram of the embodiment 3 under different scan rates of 7-50 mV $s^{-1}$.
Figure 2D:
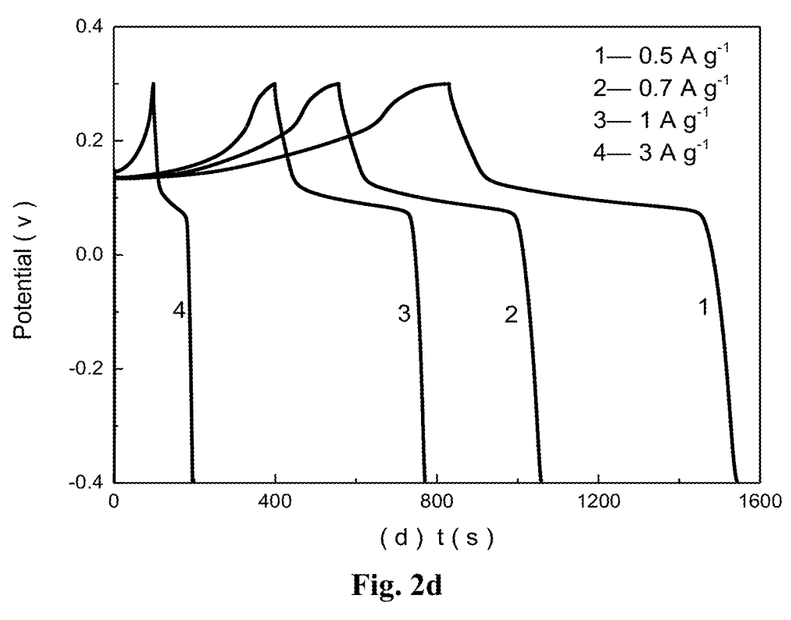
FIG. 2d is a GCD curve diagram of the embodiment 1 under different current densities of 0.5-3 A $g^{-1}$.
Figure 2E:
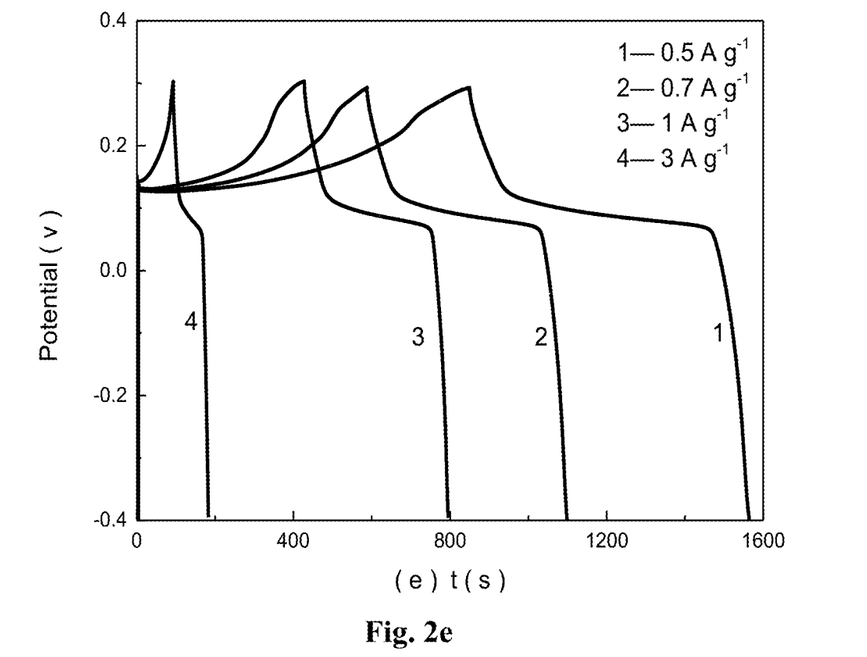
FIG. 2e is a GCD curve diagram of the embodiment 2 under different current densities of 0.5-3 A $g^{-1}$.
Figure 2F:
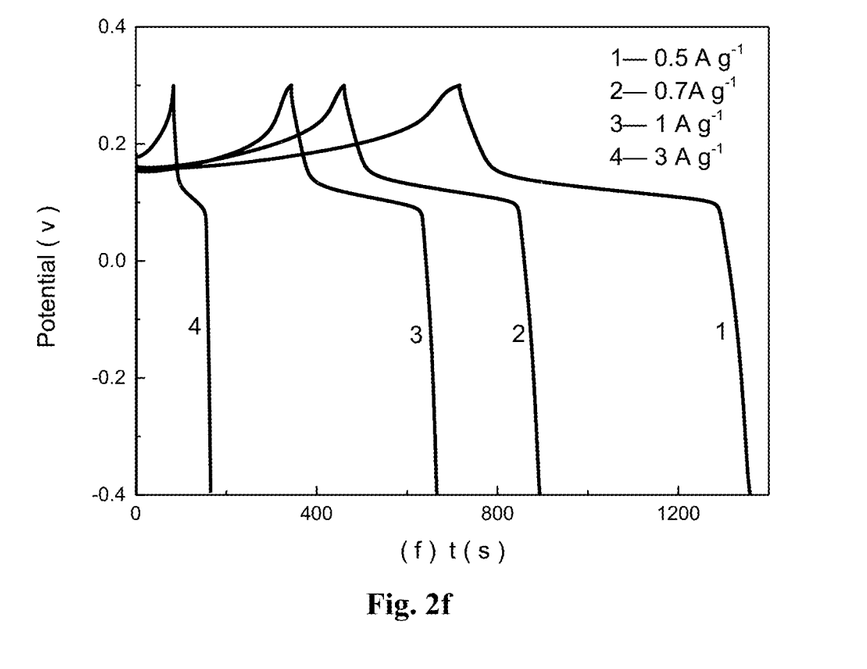
FIG. 2f is a GCD curve diagram of the embodiment 3 under different current densities of 0.5-3A $g^{-1}$.
Figure 3A:
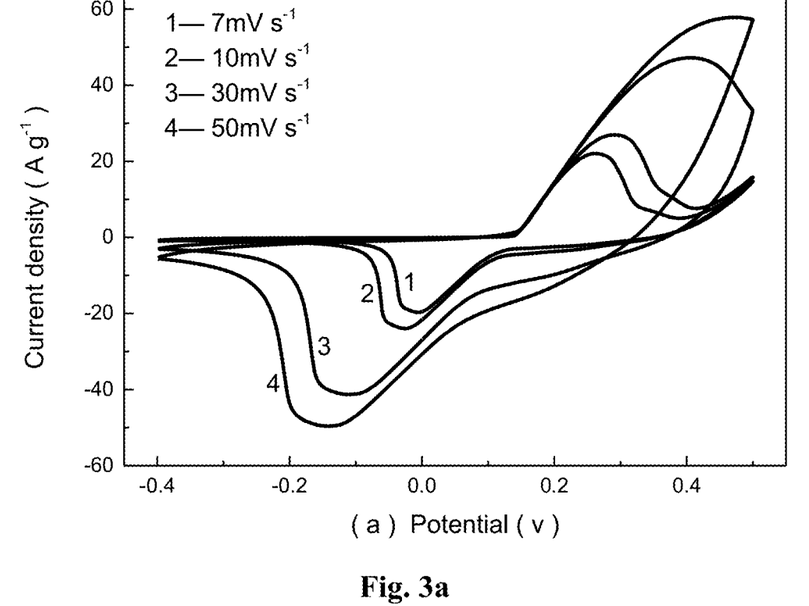
FIG. 3a is a CV curve diagram of a comparison 1 under different scan rates of 7-50 mV
Figure 3B:
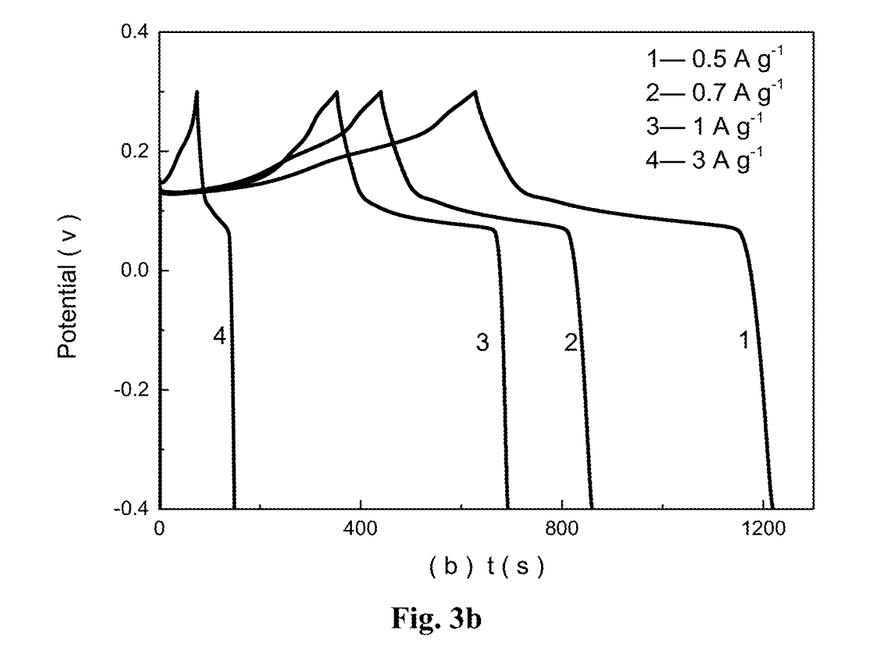
FIG. 3b is a GCD curve diagram of the comparison 1 under different current densities of 0.5-3A $g^{-1}$.
Figure 4A:
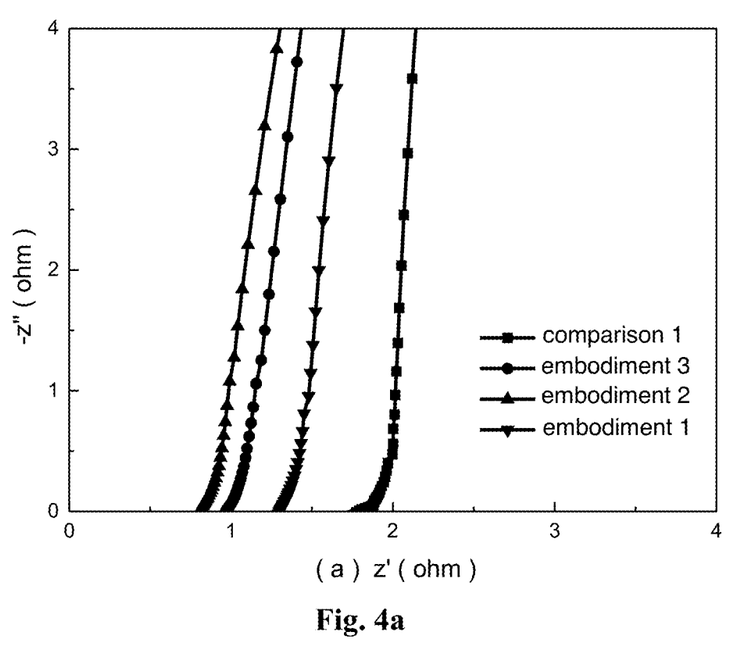
FIG. 4a is an EIS comparison diagram of the embodiments 1-3 and the comparison 1.
Figure 4B:
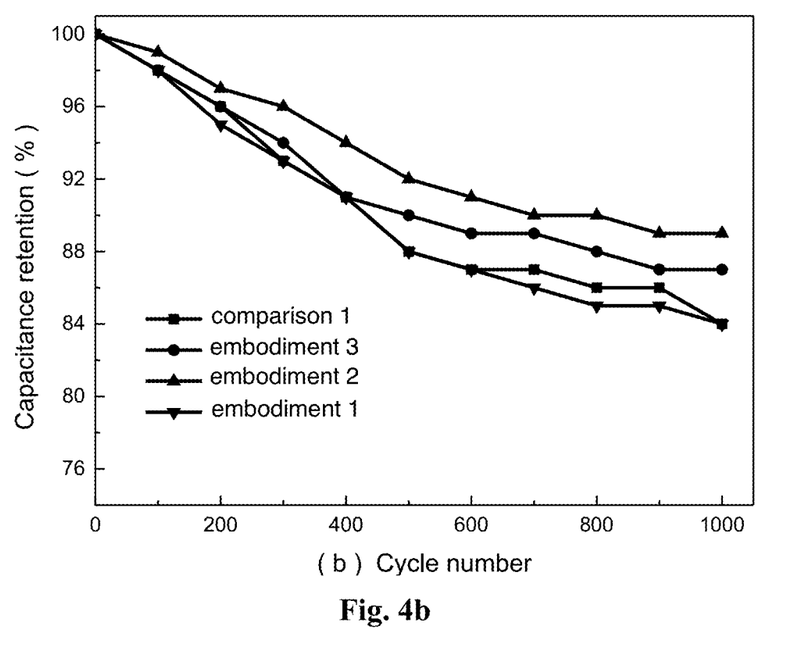
FIG. 4b is a life time comparison diagram of the embodiments 1-3 and the comparison 1 under a scan rate of 10 mV $s^{-1}$ after 1000 cycles.

2. Electrical performance test on the working electrodes formed by the electrode materials made in the above embodiments and comparison CHI660D electrochemical workstation is used to characterize the electrochemical performance of the working electrode prepared by the above method, wherein cyclic voltammetry (CV), galvanostatic charge-discharge (GCD) and electrochemical impedance spectroscopy (EIS) are mainly used. Measurement is carried out in a standard three-electrode system with 5 mol/L KOH aqueous solution as electrolyte. The carbon cloth respectively coated with the electrode slurry containing the electrode materials A1, A2, A3, and D1 is used as the working electrode, platinum electrode is used as a counter electrode, and saturated Ag/AgCl electrode is used as a reference electrode. A scan rate of cyclic voltammetry is 7-50 mV s$^{-1}$, a current density of galvanostatic charge-discharge is 0.5-3 A g$^{-1}$, a frequency range of electrochemical impedance spectroscopy is 0.1 Hz to 105 Hz and an amplitude is 5 mV. Measured electrical performance curves of each working electrode are shown as FIGS. 1a, 1b, 2a, 2b, 2c, 2d, 2e, 2f, 3a, 3b, 4a and 4b, wherein: FIG. 1a is an XRD diagram of the embodiments 1-3; FIG. 1b is an FTIR (Fourier Transform Infrared Spectroscopy) comparison chart of the embodiments 1-3; FIG. 2a is a CV curve diagram of the embodiment 1 under different scan rates of 7-50 mV s$^{-1}$; FIG. 2b is a CV curve diagram of the embodiment 2 under different scan rates of 7-50 mV s$^{-1}$; FIG. 2c is a CV curve diagram of the embodiment 3 under different scan rates of 7-50 mV s$^{-1}$; FIG. 2d is a GCD curve diagram of the embodiment 1 under different current densities of 0.5-3 A g$^{-1}$; FIG. 2e is a GCD curve diagram of the embodiment 2 under different current densities of 0.5-3 A g$^{-1}$; FIG. 2f is a GCD curve diagram of the embodiment 3 under different current densities of 0.5-3 A g$^{-1}$; FIG. 3a is a CV curve diagram of a comparison 1 under different scan rates of 7-50 mV s$^{-1}$; FIG. 3b is a GCD curve diagram of the comparison 1 under different current densities of 0.5-3 A g$^{-1}$; FIG. 4a is an EIS comparison diagram of the embodiments 1-3 and the comparison 1; FIG. 4b is a life time comparison diagram of the embodiments 1-3 and the comparison 1 under a scan rate of 10 mV s$^{-1}$ after 1000 cycles.

Referring to the measured data of each curve, specific capacitance, rate characteristics, cycle life, impedance and other performance data of each working electrode at different current densities are calculate and shown in Tables 1-3, wherein the specific capacitance of galvanostatic charge-discharge is calculated according to the following formula (i is current density, $V_i$ and $V_f$ are lowest and highest potentials).

$$C = \frac{2i \int V \cdot dt}{V^2 \big|_{V_i}^{V_f}}$$

TABLE 1 specific capacitance of embodiments 1-3 under different current densities

| current density | 0.5 A g$^{-1}$ | 0.7 A g$^{-1}$ | 1 A g$^{-1}$ | 3 A g$^{-1}$ |
|---|---|---|---|---|
| embodiment 1 | 716 F g$^{-1}$ | 698 F g$^{-1}$ | 726 F g$^{-1}$ | 551 F g$^{-1}$ |
| embodiment 2 | 720 F g$^{-1}$ | 700 F g$^{-1}$ | 727 F g$^{-1}$ | 512 F g$^{-1}$ |
| embodiment 3 | 672 F g$^{-1}$ | 631 F g$^{-1}$ | 665 F g$^{-1}$ | 489 F g$^{-1}$ |
| comparison 1 | 585 F g$^{-1}$ | 422 F g$^{-1}$ | 600 F g$^{-1}$ | 401 F g$^{-1}$ |

TABLE 2 rate characteristic and cycle life of embodiments 1-3 and comparison 1

|  | rate characteristic (1 A g$^{-1}$-3 A g$^{-1}$) | cycle lift (1000 times) |
|---|---|---|
| embodiment 1 | 76% | 84% |
| embodiment 2 | 71% | 89% |
| embodiment 3 | 73% | 87% |
| comparison 1 | 68% | 84% |

TABLE 3 impedance data of embodiments 1-3 and comparison 1

|  | embodiment 1 | embodiment 2 | embodiment 3 | comparison 1 |
|---|---|---|---|---|
| Rs (Ω) | 1.79 | 1.3 | 0.81 | 0.97 |

According to the data in Tables 1-3, it can be clearly seen that: compared with the MOFs electrode material without PEDOT coating in the comparison 1, the electrochemical performance of the MOFs composite electrode material Ni-BTC@PEDOT prepared in the embodiments 1-3 is greatly improved in specific capacitance, rate characteristics, cycle life and impedance. In terms of specific capacitance, the electrode material A2 prepared in the embodiment 2 has a specific capacitance of up to 720 F g$^{-1}$ at a current density of 0.5 A g$^{-1}$, which is 135 F g$^{-1}$ higher than 585 F g$^{-1}$ of the comparison 1. At the same time, its rate characteristics and cycle life are significantly improved while its impedance is reduced. This is because the MOFs composite electrode material Ni-BTC@PEDOT provided by the present invention has a PEDOT coating layer grown on the Ni-BTC. The PEDOT coating layer not only improves the conductivity of the composite electrode material, but also protects the structure of the material to a certain degree. As a result, the composite electrode material Ni-BTC@PEDOT combines the advantages of the Ni-BTC and the PEDOT, and comprehensive electrical performance is greatly improved.

The above embodiments only exemplarily illustrate the principles and effects of the present invention, but are not limiting. Those skilled in the art can modify or change the above-mentioned embodiments without departing from the spirit and scope of the present invention. Therefore, all equivalent modifications or changes made by those with ordinary skill in the art without departing from the spirit and technical ideas disclosed in the present invention should still be covered by the claims of the present invention.

What is claimed is:

1. A method for preparing an MOFs composite electrode material for supercapacitors, comprising steps of:
    S1: using nickel nitrate hexahydrate and benzenetricarboxylic acid as raw materials to synthesize Ni-BTC by a hydrothermal method; and
    S2: using a liquid phase method to grow PEDOT on the Ni-BTC, so as to obtain the MOFs composite electrode material Ni-BTC@PEDOT.

2. The method, as recited in claim 1, wherein the step S1 specifically comprises steps of:
    S101: dissolving a certain proportion of the nickel nitrate hexahydrate and the benzenetricarboxylic acid in a first solvent in sequence, and fully stirring to form a uniform mixed solution;

S102: transferring the mixed solution obtained in the step S101 to an autoclave, and heating at a temperature of 140-160° C. for 15-21 hours; and S103: washing a product obtained in the step S102 for 2-3 times, and drying to obtain the Ni-BTC.

3. The method, as recited in claim 1, wherein the step S2 specifically comprises steps of:

S201: adding EDOT into isopropanol and stirring for 20-30 minutes until the EDOT is fully dissolved in the isopropanol to obtain a first solution;

S202: then adding the Ni-BTC prepared in the step S1 to the first solution, stirring for 20-30 minutes, and ultra-sonicating for 10-20 minutes, so as to allow the EDOT in the first solution to enter pores of the Ni-BTC to obtain the second solution;

S203: then adding an appropriate amount of oxidant to the second solution, and stirring for 2-3 hours to obtain a composite solution; and S204: finally, suction-filtering and cleaning the obtained composite solution, and vacuum-drying at 50-70° C. for 5-7 hours to obtain the composite electrode material Ni-BTC@PEDOT.

4. The method, as recited in claim 2, wherein the step S2 specifically comprises steps of:

S201: adding EDOT into isopropanol and stirring for 20-30 minutes until the EDOT is fully dissolved in the isopropanol to obtain a first solution;

S202: then adding the Ni-BTC prepared in the step S1 to the first solution, stirring for 20-30 minutes, and ultra-sonicating for 10-20 minutes, so as to allow the EDOT in the first solution to enter pores of the Ni-BTC to obtain the second solution;

S203: then adding an appropriate amount of oxidant to the second solution, and stirring for 2-3 hours to obtain a composite solution; and S204: finally, suction-filtering and cleaning the obtained composite solution, and vacuum-drying at 50-70° C. for 5-7 hours to obtain the composite electrode material Ni-BTC@PEDOT.

5. The method, as recited in claim 2, wherein
in the step S101, a molar ratio of the nickel nitrate hexahydrate to the benzenetricarboxylic acid is (1.6-2):1.

6. The method, as recited in claim 3, wherein
a molar ratio of the EDOT to the Ni-BTC is 1:(1-4).

7. The method, as recited in claim 4, wherein
a molar ratio of the EDOT to the Ni-BTC is 1:(1-4).

8. The method, as recited in claim 3, wherein
in the step S201, a volume ratio of the EDOT to the isopropanol is 1:(100-400).

9. The method, as recited in claim 4, wherein
in the step S201, a volume ratio of the EDOT to the isopropanol is 1:(100-400).

10. The method, as recited in claim 3, wherein
in the step S203, the oxidant is iron p-toluenesulfonate, and p-toluenesulfonic acid monohydrate is also added to prevent hydrolysis of ferric ions; a molar ratio of the p-toluenesulfonic acid monohydrate, the iron p-toluenesulfonate, and the EDOT is (1-2.5):(1-2.5):1.

11. The method, as recited in claim 4, wherein
in the step S203, the oxidant is iron p-toluenesulfonate, and p-toluenesulfonic acid monohydrate is also added to prevent hydrolysis of ferric ions; a molar ratio of the p-toluenesulfonic acid monohydrate, the iron p-toluenesulfonate, and the EDOT is (1-2.5):(1-2.5):1.

12. The method, as recited in claim 6, wherein
in the step S203, the oxidant is iron p-toluenesulfonate, and p-toluenesulfonic acid monohydrate is also added to prevent hydrolysis of ferric ions; a molar ratio of the p-toluenesulfonic acid monohydrate, the iron p-toluenesulfonate, and the EDOT is (1-2.5):(1-2.5):1.

13. The method, as recited in claim 7, wherein
in the step S203, the oxidant is iron p-toluenesulfonate, and p-toluenesulfonic acid monohydrate is also added to prevent hydrolysis of ferric ions; a molar ratio of the p-toluenesulfonic acid monohydrate, the iron p-toluenesulfonate, and the EDOT is (1-2.5):(1-2.5):1.

14. The method, as recited in claim 8, wherein
in the step S203, the oxidant is iron p-toluenesulfonate, and p-toluenesulfonic acid monohydrate is also added to prevent hydrolysis of ferric ions; a molar ratio of the p-toluenesulfonic acid monohydrate, the iron p-toluenesulfonate, and the EDOT is (1-2.5):(1-2.5):1.

15. The method, as recited in claim 9, wherein
in the step S203, the oxidant is iron p-toluenesulfonate, and p-toluenesulfonic acid monohydrate is also added to prevent hydrolysis of ferric ions; a molar ratio of the p-toluenesulfonic acid monohydrate, the iron p-toluenesulfonate, and the EDOT is (1-2.5):(1-2.5):1.

* * * * *